US011308261B2

(12) United States Patent
Noyes et al.

(10) Patent No.: US 11,308,261 B2
(45) Date of Patent: Apr. 19, 2022

(54) SYSTEMS AND METHODS FOR SYNCHRONIZING GRAPHICAL DISPLAYS ACROSS THIN CLIENT DEVICES

(71) Applicant: Bluebeam, Inc., Pasadena, CA (US)

(72) Inventors: Peter Noyes, Sunland, CA (US); Jonathan Rothberg, Pasadena, CA (US)

(73) Assignee: BLUEBEAM, INC., Pasadena, CA (US)

( * ) Notice: Subject to any disclaimer, the term of this patent is extended or adjusted under 35 U.S.C. 154(b) by 0 days.

(21) Appl. No.: 16/683,889

(22) Filed: Nov. 14, 2019

(65) Prior Publication Data

US 2021/0149988 A1 May 20, 2021

(51) Int. Cl.
*G06F 40/14* (2020.01)
*H04L 67/55* (2022.01)
*H04L 67/1095* (2022.01)
*H04L 65/60* (2022.01)

(52) U.S. Cl.
CPC ............ *G06F 40/14* (2020.01); *H04L 65/601* (2013.01); *H04L 67/1095* (2013.01); *H04L 67/26* (2013.01)

(58) Field of Classification Search
None
See application file for complete search history.

(56) References Cited

U.S. PATENT DOCUMENTS

| | | | |
|---|---|---|---|
| 2014/0032500 A1* | 1/2014 | Wibbeler | G06F 16/93 707/661 |
| 2017/0060829 A1* | 3/2017 | Bhatt | G06F 40/134 |
| 2018/0253412 A1* | 9/2018 | Biswas | G06F 40/134 |
| 2019/0289070 A1* | 9/2019 | Gorgenyi | G06F 40/14 |
| 2021/0004526 A1* | 1/2021 | Kahn | G06F 40/154 |
| 2021/0073324 A1* | 3/2021 | Gupta | G06F 40/169 |

OTHER PUBLICATIONS

Guerrero, Luis A., Sergio F. Ochoa, Jose A. Pino, and Cesar A. Collazos. "Selecting computing devices to support mobile collaboration." Group Decision and Negotiation 15, No. 3 (2006): 243-271. (Year: 2006).*
U.S. Appl. No. 16/239,044, filed Jan. 3, 2019.

* cited by examiner

*Primary Examiner* — Frank D Mills
(74) *Attorney, Agent, or Firm* — Bookoff McAndrews, PLLC

(57) ABSTRACT

Systems and methods are disclosed for synchronizing a document markup modification across a plurality of devices. One method comprises subscribing to one or more events occurring in a first document markup application, the first document markup application being a first thin client application, and receiving a notification indicating a modification to a document markup in the first document markup application. A cross-compatible markup object associated with the modified document markup may be extracted and transmitted to a second document markup application, the second document markup application being a second thin client application.

19 Claims, 8 Drawing Sheets

```
{
    "author": "pnoyes",
    "contents": "",
    "creationDate": "2018-10-05T10:35:35-07:00",
    "hidden": false,
    "lock": false,
    "modDate": "2018-10-05-0T12:51:19-07:00",
    "name": "LXRADSDYFUHWOFGX",
    "noRotate": false,
    "noView": false,
    "noZoom": fa;se,
    "opacity": 1,
    "print": true,
    "readOnly": false,
    "rect": [
        107.5,
        107.5,
        198.5,
        198.5
    ],
    "strokeColor": [
        "RGB",
        1,
        0,
        0
    ],
    "subject": "Ellipse",
    "toggleNoView": false,
    "type": "Circle",
    "rectDiff": [
        0.5,
        0.5,
        0.5,
        0.5
    ],
    "width": 1,
    "style": "S",
    "fillColor": [],
}
```
70A

```
<<
    /BS<<
        /S /S
        /Type /Border
        /W 1
    >>
    /C [
        1
        0
        0
    ]
    /CreationDate (D:20181005103535-07'00')
    /F 4
    /M (D:20181005125119-07'00')
    /NM (LXRADSDYFUHWOFGX)
    /RD [
        0.5
        0.5
        0.5
        0.5
    ]
    /Rect [
        107.5
        107.5
        198.5
        198.5
    ]
    /Subj (Ellipse)
    /Subtype /Circle
    /T (pnoyes)
>>
```
10A

FIG. 7

SYSTEMS AND METHODS FOR SYNCHRONIZING GRAPHICAL DISPLAYS ACROSS THIN CLIENT DEVICES

TECHNICAL FIELD

The present disclosure relates to systems and methods for synchronizing graphical displays across a plurality of devices. More particularly, the present disclosure relates to systems and methods for synchronizing document markup modification across a plurality of devices. The present disclosure further relates to systems and methods for synchronizing document markup modification between thin client applications.

BACKGROUND

Creation, distribution, and management of information is at the core of modern day business. Many different ways of presenting information have been developed, including word processing documents, spreadsheets, graphics, photographs, design drawings and plans, and so forth. This information content may be generated using a specific software application. In an enterprise setting, multiple individuals may collaborate on creating, reviewing, editing, and/or deleting such information content. Due to advancement in high-speed data communications and computing devices, such collaboration may involve remote users dynamically viewing and making changes to information content, by exchanging pertinent data among each other in real-time.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

One embodiment provides a computer-implemented method for synchronizing a document markup modification across a plurality of devices, comprising: subscribing to one or more events occurring in a first document markup application, the first document markup application being a first thin client application; receiving a notification indicating a modification to a document markup in the first document markup application; extracting a cross-compatible markup object associated with the modified document markup; and transmitting the cross-compatible markup object to a second document markup application, the second document markup application being a second thin client application.

One embodiment provides a system for synchronizing a document markup modification across a plurality of devices. The system may comprise one or more processors; and at least one non-transitory computer readable medium storing instructions which, when executed by the one or more processors, cause the one or more processors to perform a method comprising: subscribing to one or more events occurring in a first document markup application, the first document markup application being a first thin client application; receiving a notification indicating a modification to a document markup in the first document markup application; extracting a cross-compatible markup object associated with the modified document markup; and transmitting the cross-compatible markup object to a second document markup application, the second document markup application being a second thin client application.

One embodiment provides a non-transitory computer readable medium for synchronizing a document markup modification across a plurality of devices. The non-transitory computer readable medium may store instructions that, when executed by one or more processors, cause the one or more processors to perform a method comprising: subscribing to one or more events occurring in a first document markup application, the first document markup application being a first thin client application; receiving a notification indicating a modification to a document markup in the first document markup application; extracting a cross-compatible markup object associated with the modified document markup; and transmitting the cross-compatible markup object to a second document markup application, the second document markup application being a second thin client application.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 7 depicts an exemplary cross-compatible markup object and a corresponding exemplary native markup object, according to one aspect of the present disclosure.

DETAILED DESCRIPTION OF EMBODIMENTS

Figure 1:
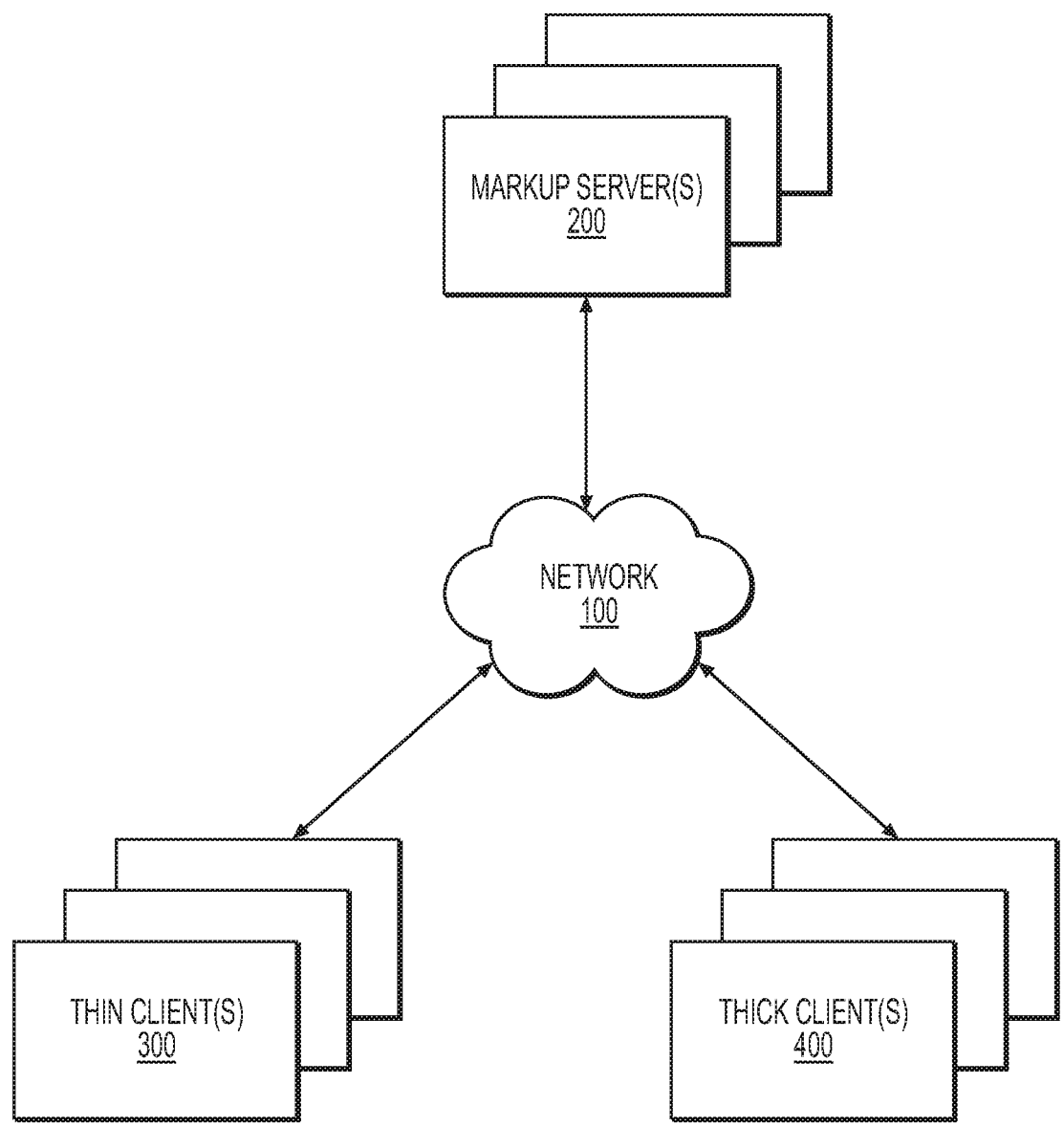
FIG. 1 depicts an exemplary system infrastructure of communicatively coupled thin client(s), markup server(s), and thick client(s), according to one aspect of the present disclosure.

The following embodiments describe systems and methods for synchronizing a document markup modification across a plurality of devices and, more particularly, for synchronizing a document markup modification between thin client applications.

Due to the existence of different computing platforms employing a variety of operating systems, application programs, and processing and graphic display capabilities, device-independent file formats, such as the Portable Document Format (PDF), have been developed to facilitate information exchange among different computing platforms. The PDF standard is a combination of a number of technologies, including a simplified PostScript interpreter subsystem, a font embedding subsystem, and a storage subsystem. PostScript is a page description language for generating the layout and the graphics of a document. Further, per the requirements of the PDF storage subsystem, all elements of the document, including text, vector graphics, and raster (bitmap) graphics, collectively referred to herein as graphic elements, are encapsulated in a single file. The graphical elements are not necessarily encoded to a specific operating system, software application, or hardware, but may be designed to be rendered in the same manner regardless of the specifications of the system writing or reading such data. The cross-platform capability of PDF aided its widespread adoption, and it is now a de facto document exchange standard. Although originally proprietary, PDF has been released as an open standard published by the International Organization for Standardization (ISO) as ISO/IEC 32000-2:2017. Currently, PDF is utilized to encode a wide variety of document types, including those composed largely of text, and those composed largely of vector and raster graphics.

One of several improvements that have been made since the initial release of the PDF format is support for adding markups to a base document. The markups are graphically overlaid on the underlying document, with various properties being precisely controlled by the user. Thus, the functionality is similar to graphical illustration/design and image manipulation applications where various objects can be positioned on a document canvas by navigating a cursor to a desired location and providing a subsequent input to make placement permanent. Before positioning the markup, the type of the markup may be selected (e.g., text box, line, polygon, note, ink, etc.).

Markups may be understood to be a type of data object that is associated with an underlying document, and may generally refer to a conceptual entity corresponding to a contiguous block of memory at a specific location and with a specific size. A markup may be defined by one or more properties that define its characteristics. A markup may be defined by a type, or a broad category of objects such as geometric primitives including points, lines (single segment or multi-segment), arcs, ellipses, polygons, and the like. Markups may also take more complex forms such as callout boxes, arrows, text/note boxes, and so forth. The PDF standard defines several common markup types that may be rendered similarly across diverse reader applications, though with slight variances in appearance from one implementation to another. The particular characteristics of the markup may be defined by one or more parameters including dimensions, placement location (e.g., positioning coordinates), color, line thickness, fill patterns and colors, and others that are specific to that markup type. Although markups may be stored in the document, they generally do not become a part of an underlying drawing; visually, the markups are overlaid on a separate layer of the document, such as over the main text and/or image layers. The markups may be allowed to be viewed when overlaid and may be toggled on or off as desired.

One way to develop collaborative document editing applications based on documents encoded in the PDF format, to enable remote users to collaboratively manipulate markups within PDF documents, is to create and utilize markup objects representative of modified markups. Such markup objects may be used to propagate or synchronize modified markups across user devices during collaborative sessions. The markup objects may be PDF dictionary objects extracted from PDF document files, each containing a set of key-value pairs that describe the attributes of the markup. Such a markup object (i.e., a PDF dictionary object) may also be referred to as a PDF markup object (in the sense that the markup object may be in PDF format), standard markup object (in the sense that the markup object may be in ISO-standardized format), a native markup object (in the sense that the markup object may be extracted from a PDF file and maintained/represented as a PDF dictionary object), and/or a proprietary or custom markup object (in the sense that the extraction and/or formation of the markup object may be performed according to a schema specific to or customized to an organization such as a company). Due to the nuances and complexity involved with processing such markup objects, a substantial amount of processing may be necessary at the recipient user's device to properly render and display the modified markups based on the markup objects. Therefore, collaborative PDF markup editing may require installation on a computer system having a substantial processing and storage capability (e.g., thick client), of an application specifically designed to manage collaborative sessions as well as process/interpret PDF markup objects in their native format. With the proliferation of computing device types with varying computing resources, computing devices with limited capabilities such as, for example, thin clients, may lack the necessary computing power or storage to install and run such an application. Furthermore, devices other than conventional desktop computers such as, mobile phones, tablets, gaming consoles, etc., may not be well suited for such an application.

Therefore, there is a need for an open, more ubiquitous and accessible format for markups, that is suitable for consumption by various client types and applications, such as thin client computing devices. Further, there is a need for a mechanism that enables markup collaboration across thin client computing devices.

One disclosed embodiment is directed to propagating a document markup modification across thin client computing devices, by utilizing cross-compatible markup objects (i.e., browser-friendly markup objects) that are more consumable by thin client computing devices than native markup objects (i.e., markup objects in native, PDF dictionary form). The disclosed embodiment may thus enable users of thin client computing devices to collaboratively modify document markups, and to view the modified document markups in their respective computing devices in real-time. Briefly, in one embodiment, a first thin client may subscribe to one or more events occurring in a document markup application, receive a notification indicating a modification to a document markup in the document markup application, extract a cross-compatible markup object associated with the modified document markup, and transmit the cross-compatible markup object to a second thin client.

The subject matter of the present disclosure will now be described more fully hereinafter with reference to the accompanying drawings, which form a part hereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter may be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof. The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Referring now to the appended drawings, FIG. 1 shows an exemplary system infrastructure of communicatively coupled thin client(s), markup server(s), and thick client(s). In general, FIG. 1 depicts thin client(s) 300, markup server(s) 200, and thick client(s) 400, all connected via a network 100.

Figure 9:
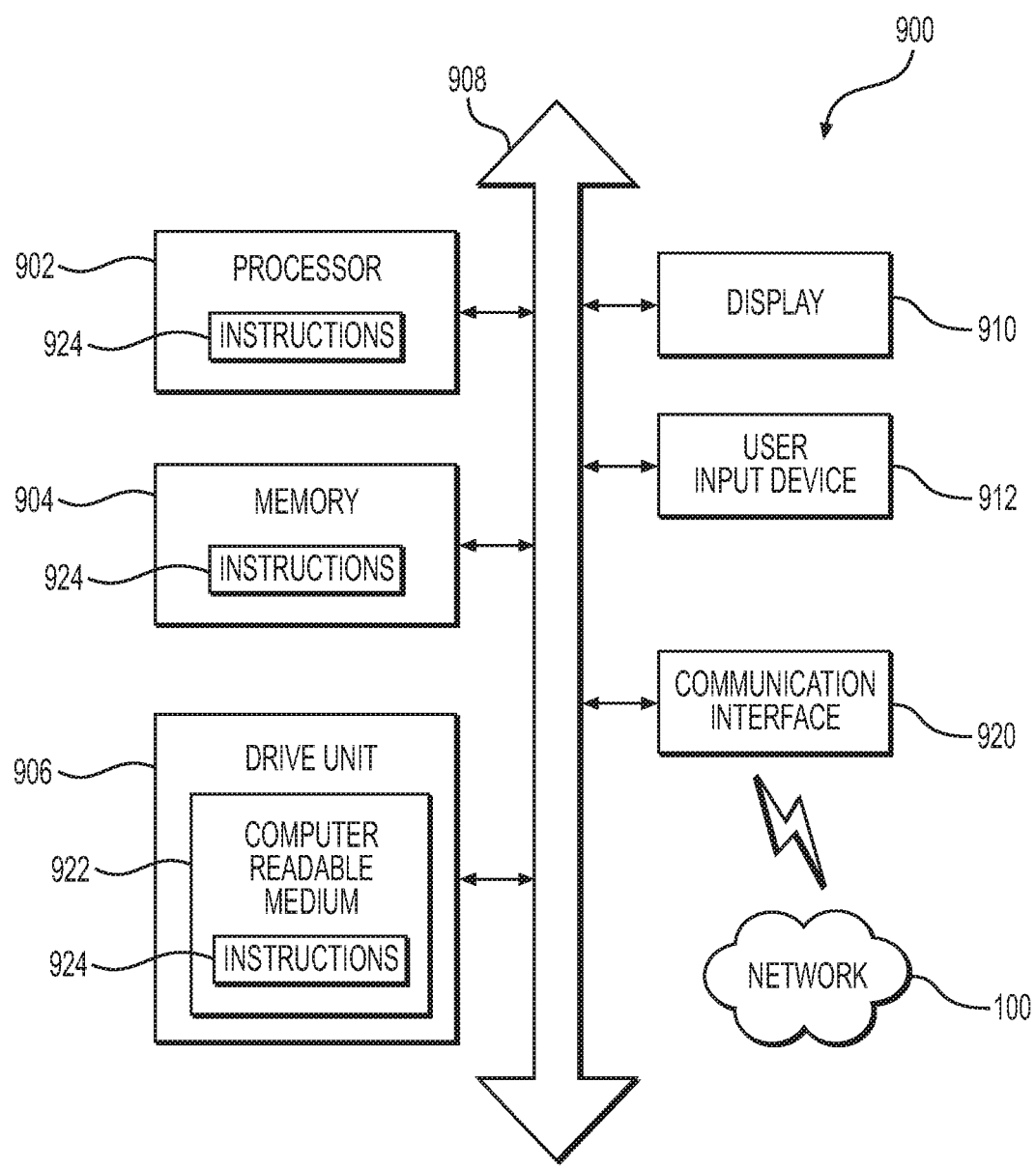
FIG. 9 illustrates an implementation of a computer system that may execute techniques presented herein.

Thick client 400 may be implemented in a computing system consistent with or similar to that depicted in FIG. 9. Notably, the computing system in which the thick client 400 is implemented may provide rich functionality independent of a connected server. For example, thick client 400 may be implemented in a full-featured computer including a local, nonvolatile data storage (e.g., hard drive). In one embodiment, thick client 400 may be a computer with a software application installed thereon (e.g., a native application) to enable document markup display and modification utilizing native markup objects (e.g., thick client application 410 in FIG. 2). Thick client 400 may be connected to a network 100, which may be the Internet, via a wired or wireless connection, and may be in communication with markup server(s) 200 via the network 50. In the present disclosure, a computer that performs document markup display and modification discussed herein using a native application developed for that purpose (i.e., an application that is developed for document markup display and modification and installed locally) may be referred to as thick client 400. Further, a computer that performs document markup display and modification discussed herein without such a native or locally-installed application may be referred to as thin client 300, which will be explained in greater detail below.

Thin client 300 may also be implemented in a computing system consistent with or similar to that depicted in FIG. 9. However, in contrast to thick client 400, thin client 300 may be implemented in a lightweight computer optimized for establishing a network connection with a server-based computing environment, and may rely heavily or partially on network servers to fulfill a significant part of resource requirement. For example, the computing system in which the thin client 300 is implemented may be a desktop terminal that has no local, nonvolatile data storage (e.g., hard drive). In some embodiments, thin client 300 may be implemented in a full-featured computer, similar to that of thick client 400, but may not include a separate installation of a software application (i.e., may not include a native application) for document markup display and modification. In other words, thin client 300 may be a full-featured computer that may rely heavily or partially on one or more network servers (i.e., not on a local software application) to perform document markup display and modification contemplated in the present disclosure, without requiring installation of a native application developed for that purpose. Thus, functions related to document markup display and modification that utilize cross-compatible objects, which will be described in greater detail below, may be performed by thin client 300, and server-based components can be leveraged to handle more resource-intensive tasks such as, for example, processing of PDF data (i.e., native data). In some embodiments, thin client 300 may be a computer, either full-featured or lightweight, that may access document markup display and modification capability via a web-based application. For example, a web-based application may be a client-server computer program which a client may run in a web browser. Thus, using techniques discussed herein, a user may be able to view, create and/or modify markups overlaying a base image/text layer without needing to install software having markup features natively.

Server(s) connected with the thin client 300 may perform various functions, e.g., executing software applications, running logic, storing data, etc., and take on the processing load of the thin client 300. As explained above, thin client 300 may be a computer configured to execute a web browser but might not require a separate installation of a software application for document markup display and modification of the present disclosure (i.e., a web-based application). Thin client 300 may be connected to a network 100 via a wired or wireless connection, and may be in communication with markup server(s) 200 via the network 100.

Thin client(s) 300, markup server(s) 200, and thick client(s) 400 may all be connected to network 100, and may be in communication with one another via the network 100. Data communication between thin client(s) 300, markup server(s) 200, and thick client(s) 400 (e.g., transmission of cross-compatible markup objects and/or native markup objects described below) may be performed utilizing a software library or a communication framework that may allow client-to-server (and vice versa) communications, and/or may allow remote procedure calls.

Network connections may be Internet Protocol Suite-compliant with a Transmission Control Protocol (TCP) component as well as a User Datagram Protocol (UDP) component. Depending on the needs of the services involved, the more reliable and ordered (albeit slower) delivery of data possible through a TCP connection may be more appropriate, or the faster but more unreliable delivery of data through a UDP connection may be more appropriate. Although any network modality may be utilized to transfer data among thin client(s) 300, markup server(s) 200, and thick client(s) 400, it will be appreciated that certain improvements may be realized if the protocol selection is tailored to the particular needs. Where an embodiment contemplates such a selection, those will be particularly noted. Along these lines, the specific network topology is presented by way of example only, however, and any other type of arrangement may be substituted.

Figure 2:
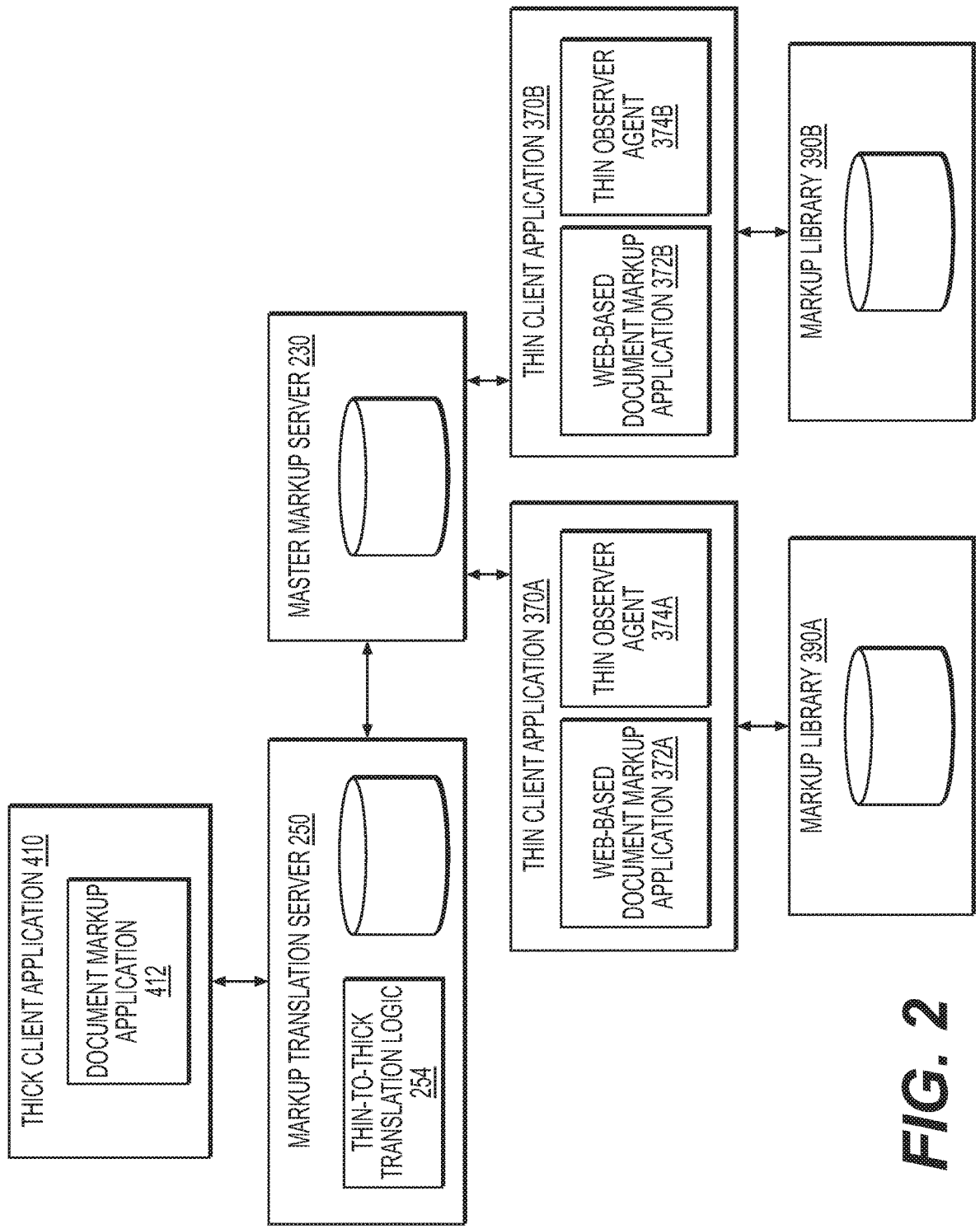
FIG. 2 depicts an exemplary embodiment of a document markup synchronization system, according to one aspect of the present disclosure.

FIG. 2 shows an exemplary embodiment of a document markup synchronization system, according to one aspect of the present disclosure. In general, FIG. 2 depicts a master markup server 230, thin client applications 370A and 370B, markup libraries 390A and 390B, a markup translation server 250, and a thick client application 410. In one embodiment, master markup server 230 and markup translation server 250 may be instances of markup server(s) 200, thin client applications 370A and 370B may be instances of thin client(s) 300, and thick client application 410 may be an instance of thick client(s) 400.

Master markup server 230 may be part of the server-computing environment, i.e., markup server(s) 200, discussed above in reference to FIG. 1. For example, master markup server 230 may be one of the markup servers 200, or may comprise multiple markup servers 200 together configured to perform functions of the master markup server 230. Master markup server 230 may be in communication with the various components depicted in FIG. 2 (i.e., thin client applications 370A and 370B, markup translation server 250) via network 100. Master markup server 230 may receive cross-compatible markup objects from the thin client applications 370A and 370B (or the thin observer agents 374A and 374B thereof) and store the cross-compatible markup objects in a master database. Particularly, master markup server 230 may receive a cross-compatible markup object from a thin client application 370A, store the cross-compatible markup object in a master database, and transmit the cross-compatible markup object to a thin client application 370B. This way, master markup server 230 enables real-time, lightweight markup collaboration among a plurality of thin clients 300. The transmission of the cross-compatible markup objects between the master markup server 230 and thin client applications 370A and 370B may be performed using, for example, TCP/IP protocol. In one embodiment, the transmission of the cross-compatible markup objects from the master markup server 230 to a thin client application 370A or 370B may occur in real-time using WebSockets.

Thin client applications 370A and 370B may be implemented on thin client(s) 300 discussed above in reference to FIG. 1. Thin client applications 370A and 370B may comprise the same or largely the same components to perform markup modification and collaboration session functionalities. Therefore, for the sake of brevity, the relevant components in the thin client applications 370A and 370B will be described with respect to the thin client application 370A only. In one embodiment, thin client application 370A, may comprise a web-based document markup application 372A and a thin observer agent 374A. As will be discussed in greater detail below, the web-based document markup application 372A may be a web-based document reviewing/editing software application which enables a user to locate a document from a remote storage, open and make modifications to the document (e.g., add, remove, or modify drawings, annotations, markups, etc.), save the modified document in a remote storage, delete the document, collaborate with other users (i.e., users on remote devices, e.g., thin client(s) 300) synchronously or asynchronously to review/edit the document, etc. In one embodiment, the web-based document markup application 372A may be a PDF document reviewing/editing software application. However, in other embodiments, the web-based document markup application 372A may be a document reviewing/editing software application also compatible with other types of documents such as, e.g., word processing document, CAD drawings, etc. The web-based document markup application 372A may be provided as software as a service (SaaS). Thin observer agent 374A may be a software module that subscribes to events occurring in the web-based document markup application 372A, and may be notified of the events as they occur. The types of events that occur in the web-based document markup application 372A and get reported to the thin observer agent 374A may include, but might not be limited to, an addition, modification, deletion, and/or movement of a markup in the web-based document markup application 372A. In response to receiving a notification indicating an event associated with a markup, thin observer agent 374A may extract a cross-compatible markup object associated with the markup and transmit the cross-compatible markup object to the master markup server 230.

As alluded to above, thin client application 370A may be an application that is implemented on a thin client 300, and may comprise a web-based document markup application 372A. For example, thin client application 370A may be a web browser installed on a thin client 300, which provides a platform for the web-based document markup application 372A to run. Although FIG. 2 shows the web-based document markup application 372A and the thin observer agent 374A enclosed within the thin client application 370A, most of the application logic and data storage for the web-based document markup application 372A may be housed and carried out in a server-computing environment, i.e., markup server(s) 200, discussed above in reference to FIG. 1, and the web-based document markup application 372A may be accessed and provided on the thin client 300 by using a web browser. For example, thin client application 370A may be a web browser (e.g., JavaScript-enabled web browser) configured to display document markup modifications using cross-compatible markup objects received from the master markup server 230. As alluded to above, the actual application logic enabling the functionalities of the web-based document application 372A and the thin observer agent 374A may be at least partially stored and performed at a back-end system, such as the master markup server 230. Accordingly, in one embodiment, thin client application 370A may be an application installed on a thin client 300, such as a web browser, configured to interpret the cross-compatible, or browser-friendly, markup objects received from the master markup server 230 and to run the web-based document markup application 372A within the browser. Because at least some of the processing takes place at the back-end server(s), the web-based document markup application 372A may also be referred to as a server-based document markup application in the present disclosure. In some embodiments, the server-based document markup application may be accessed using means different from a web-browser. For example, the server-based document markup application may also be accessed and provided on various types of devices, including but not limited to, mobile phones, tablets, gaming devices, Internet-of-Things (IoT) devices, etc., using an application built on a common application platform such as, e.g., Universal Windows Platform (UWP).

Markup library 390A may be a shared markup rendering library coupled to the thin client application 370A, such that the web-based document markup application 372A may render and display the cross-compatible markup objects across various types of devices using the bindings stored in the markup library 390A. More specifically, markup library 390A may comprise a cross platform software developer's kit (SDK) for rendering and mutating markups in the web-based (i.e., server-based) document markup application 372A accessed by a variety of devices. For example, markup library 390A may be a cross-platform markup rendering library written in the Rust programming language, with bindings for HTML5 Canvas using WebAssembly and/or iOS.

Master markup server 230 may transmit the cross-compatible markup objects to another markup server(s) 200. For example, master markup server 230 may transmit the cross-compatible markup objects to markup translation server 250 for further processing. The transmission of the cross-compatible markup objects from the master markup server 230 to the markup translation server 250 may be performed using, for example, TCP/IP protocol, in order to "push" the cross-compatible markup objects to the markup translation server 250 periodically, upon trigger events, and/or as they become available.

Markup translation server 250 may also be part of the server-computing environment, i.e., markup server(s) 200, discussed above in reference to FIG. 1. For example, markup translation server 250 may be one of the markup servers 200, or may comprise multiple markup servers 200 together configured to perform functions of the markup translation server 250. Markup translation server 250 may comprise a thin-to-thick translation logic 254. As will be further elaborated below, markup translation server 250 may receive cross-compatible markup objects from the master markup server 230, and may use the thin-to-thick translation logic 254 to translate the cross-compatible markup objects to native markup objects. The native markup objects may then be stored in a local storage or a remote storage in communication with the markup translation server 250. The native markup objects may be available for consumption by the thick client application 410. The native markup objects may be transmitted to the thick client application 410 using, for example, TCP/IP protocol. The transmission may occur periodically, upon trigger events, as the native markup objects become available, and/or in response to requests generated by the thick client application 410.

Thick client application 410 may be a software application installed and executed on a thick client 400 discussed above in reference to FIG. 1. Accordingly, most or the majority of the processing required by the thick client application 410 may be performed at the client side (i.e., thick client 400) and may involve only aperiodic connection to a server computing environment (e.g., for archival or data communication purposes). For example, the thick client application 410 may run on a windowing system, and accordingly has a number of interface elements that are common to such applications. Each of thick clients 400 may have a copy of the thick client application 410 installed thereon. The copies of the thick client application 410 need not be identical, however, and some thick clients 400 may have a copy with a differing set of functionalities than another such as with trial versions, reader-only versions, and so forth. In some embodiments, some of the processing required by the thick client application 410 may be performed at the server side.

Thick client application 410 may comprise a document markup application 412. As will be discussed in greater detail below, the document markup application 412 may be a document reviewing/editing software application which enables a user to locate a document from a local or remote storage, open and make modifications to the document (e.g., add, remove, or modify drawings, annotations, markups, etc.), save the modified document in a local or remote storage, delete the document, collaborate with other users (i.e., users on remote devices, e.g., thick client(s) 100 and/or thin client(s) 300) synchronously or asynchronously to review/edit the document, etc. In one embodiment, the document markup application 412 may be a PDF document reviewing/editing software application. However, in other embodiments, the document markup application 412 may be a document reviewing/editing software application also compatible with other types of documents such as, e.g., word processing document, CAD drawings, etc.

As alluded to above, thick client application 410 may receive native markup objects from the markup translation server 250, after cross-compatible objects have been converted to native markup objects at the markup translation server 250. Therefore, while the master markup server 230 enables real-time, lightweight collaboration among thin clients 300 using cross-compatible markup objects, the markup translation server 250 may publish the markup objects being modified at one or more thin clients 300 to native markup objects, such that any device with a conforming document viewing/editing software (i.e., software configured to render native markup objects), including thick clients 400, may also be able to consume and display those markups. In one embodiment, upon user selection, a thick client application 410 may reach out to the markup translation server 250 for any markups that have been modified or newly created with respect to a particular document. In some embodiments, a thick client application 410 may receive native markup objects periodically. In some embodiments, a thick client application 410 may receive native markup objects incrementally, meaning the thick client application 410 may be configured to fetch native markup objects from the markup translation server 250 when there are any changes in markups associated with a particular document.

In one embodiment and as will be discussed in greater detail below, a cross-compatible markup object may be a JavaScript Object Notation (JSON) object describing a markup modified by a user of a web-based document markup application 372A or 372B. In contrast, a native markup object may be a PDF dictionary object corresponding to such a cross-compatible markup object describing the modified markup (i.e., a PDF dictionary object translated from the JSON object). Therefore, a cross-compatible markup object may be more consumable, and more easily and quickly processed (e.g., less processing-intensive) by a web-based application than a native markup object. Cross-compatible markup objects may be used to synchronize displays across thin clients 300 during a markup collaboration session. Native markup objects may be created by translating the cross-compatible markup objects, but the native markup objects might not be used to synchronize displays across thin clients 300, as web-based document markup applications 372A and 372B of thin clients 300 may be configured to use cross-compatible markup objects rather than native markup objects, for the reasons discussed above (e.g., more consumable, less processing-intensive, etc. for web-based applications). Instead, native markup objects may be archived or stored in a document store, and be available for rendering by thick clients 400 using, for example, native applications that are developed for markup display/modification and installed locally at individual thick clients 400.

PDF lacks a consistent string encoding mechanism such as UTF-8. As known to a person of ordinary skill in the relevant art, UTF-8 is a variable width character encoding capable of encoding all 1,112,064 valid code points in Unicode using one to four 8-bit bytes, designed for backward compatibility with American Standard Code for Information Interchange (ASCII). PDF has a myriad of string encodings, and to properly account for all variations and full Unicode support requires significant PDF expertise. In contrast, the JSON object simply uses UTF-8, which is a format that is much more consumable by various device types of varying characteristics and processing capacities.

To illustrate the complexity involved with processing a PDF dictionary object, the following example is provided. "Blûe" is encoded in a PDF string as (Bl\374e). The \374 character is an octally encoded index into the "PDF Encoding" which is a character set specific to PDF. From there the glyph name "udieresis" can be determined from a lookup table. The actual Unicode code points can then be determined and then finally the string can be encoded as UTF-8. It would be undesirable to duplicate this type of logic at thin clients 300, which might have limited processing and/or rendering power and substantial reliance on servers compared to thick clients 400, or which might be better served by saving processing and/or rendering power by making markup display/modification process more efficient. Further, it would be undesirable to perform markup display and modification using PDF dictionary objects (e.g., native markup objects) at thin clients 300, which might be better-suited or designed to run web-based applications (e.g., web-based document markup applications 372A and 372B) in lieu of locally-installed, native applications.

Another complexity to PDF dictionary objects is that for certain markup types, the PDF Dictionary objects reference other external PDF Dictionary objects that are "Resources." For instance, markup representations for stamps and images, and for markups that contain hatch patterns and/or are measurement-based, all have such resources. To render native markup objects, all of these resource types might need to be accounted for. For example, image markups may need to have the image extracted. For stamps (of which the appearance may be arbitrary PDF content), a set of resources may need to be repackaged into a standalone PDF file, and a rasterized version of that PDF may also need to be saved. PDF supports a vast number of image types and some at this point are only supported within PDF (e.g., JBIG2 and Jpeg2000 in particular) which accounts for some of the complexity. A JSON object representative of a markup or modification thereof (e.g., a cross-compatible markup object) may not require these steps and may instead result in substantial reduction in computational load and processing time when used in conjunction with a web-based application (e.g., web-based document markup applications 372A and 372B).

It should be noted that, although thick client application 410, master markup server 230, markup translation server 250, thin client applications 370A and 370B, and markup libraries 390A and 390B are shown as separate entities in FIG. 2, all or a portion of these components (and the steps performed thereof) may be implemented in a single computing device consistent with or similar to that depicted in FIG. 9. For example, in one embodiment, master markup server 230 and markup translation server 250 may be implemented on a single computing device. In another embodiment, thick client application 410, master markup server 230, and markup translation server 250 may be implemented on a single computing device. In yet another embodiment, thin client application 370A and markup library 390A may be implemented on a single computing device, and thin client application 370B and markup library 390B may be implemented on a single computing device. In yet another embodiment, thick client application 410, master markup server 230, markup translation server 250, thin client applications 370A and 370B, and markup libraries 390A and 390B may indeed be implemented separately on their respective computing devices, as depicted in FIG. 2. In other words, one of ordinary skill will recognize that the configurations specifically discussed herein regarding the arrangement of the components depicted in FIG. 2 are merely exemplary, and it would be obvious to a person of ordinary skill in the relevant art that different combinations of components may be implemented on a single or multiple computing devices.

With continuing reference to FIG. 2, the web-based document markup applications 372A and 372B may enable users of thin clients 300 to collaborate in a real-time document markup modification session. For example, the user of the thin client application 370A may invite the user of the thin client application 370B to a document markup modification session, using the web-based document markup application 372A. The invitation may be sent by an email, a text message, a chat message, etc. The user of the thin client application 370B may join the document markup modification session by accepting the invitation, for example, by clicking a link in the invitation or by starting the web-based document markup application 372B and inputting a session identifier and/or a password provided in the invitation. Any now known or later developed forms of invitation and authorization process may be used to invite and authorize access to a document markup modification session. Further, the user of the thin client application 370A may set permissions, so that the user of the thin client application 370B may have limited or full access/privileges to document markups and/or modifications thereof. For example, the permissions may specify whether the invited user is authorized to view, add, modify, delete, upload, and/or download certain markups. Once users of the thin client application 370A and the thin client application 370B are in-session, the users may collaboratively view, add, modify, and/or delete the document markups (any of these actions will be referred to as a "markup modification" throughout this disclosure) within their respective applications (i.e., web-based document markup application 372A and web-based document markup application 372B). The markup modification by a user may be monitored and reported to the master markup server 230 by an observer agent (i.e., thin observer agent 374A or thin observer agent 374B), and may further be processed by the master markup server 230 prior to being propagated to the web-based document markup application of the other user. The process of propagating the markup modification may be completed synchronously or substantially synchronously, so that the user of the receiving web-based document markup application may see the changed markup in real-time.

More particularly, the markup modification may initially be represented by a cross-compatible markup object (i.e., a browser-friendly markup object), which may be the format used by web-based markup applications 370A-370B. In the event that there are users within a markup modification session who are using the same type of client application, translation of the markup object may be unnecessary and the initial representation of the markup modification may be transmitted without being translated. Therefore, in a real-time lightweight collaboration session that only involves thin clients 300, it may be unnecessary to translate the initial representation of the markup modification to a target representation (e.g., cross-compatible markup objects to native markup objects), as the web-based document markup applications 372A-372B may both be configured to render cross-compatible markup objects. The present disclosure will primarily discuss such thin-to-thin client scenarios, with an option to publish native markup objects for consumption by thick clients as needed. Methods and systems for real-time markup modification collaboration across different client types (i.e., thick-to-thin or thin-to-thick client scenarios) are disclosed in a related U.S. Non-Provisional application Ser. No. 16/239,044, which is incorporated herein by reference in its entirety.

Figure 3:
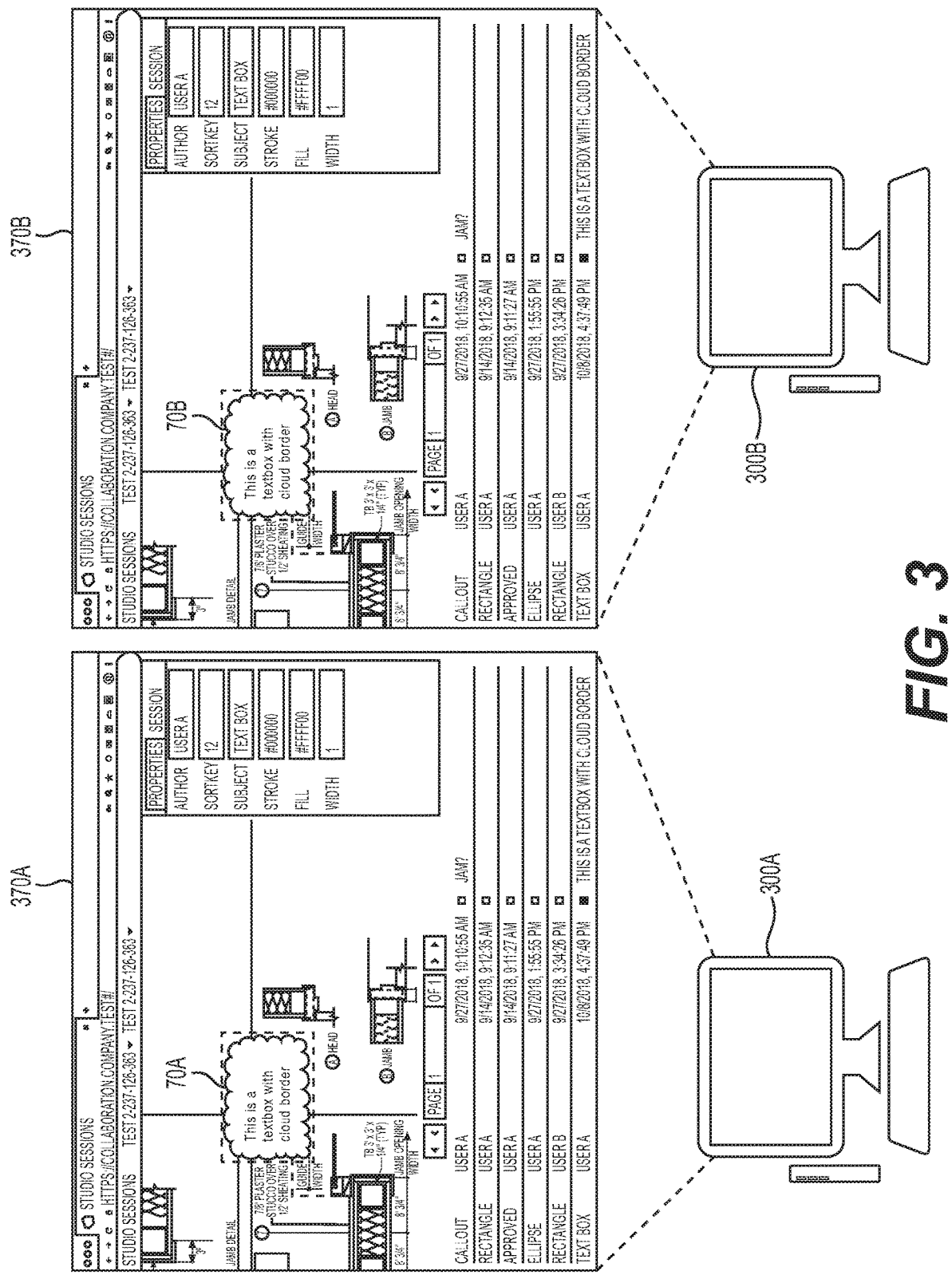
FIG. 3 depicts exemplary graphical user interfaces (GUIs) of thin client applications during a markup modification session, according to one aspect of the present disclosure.

FIG. 3 shows exemplary graphical user interfaces (GUIs) of thin client applications during a markup modification session. In general, FIG. 3 depicts a thin client application 370A, a markup 70A applied within the thin client application 370A, a thin client application 370B, and a markup 70B displayed within the thin client application 370B.

In the present disclosure, a markup modification session may be generally understood to be an interactive exchange of markups or modifications thereof among thin clients 300 (e.g., thin client 300A and thin client 300B in FIG. 3), which are participants in that markup modification session. The markup modification session may be defined by one or more markups that are reviewed and/or manipulated, and by the participants involved. Additionally, each markup modification session may have associated therewith permissions as to which participants can join that markup modification session, and the identity of the participant initiating that markup modification session. In one embodiment, the participants can join simultaneously, or in a synchronous markup modification session, to work on the markups in real-time. In other embodiments, the markup modification session may be asynchronous because it may not be necessary for each of the participants to join at the same time to work on the markups, and for providing an offline mode in case of intermittent network connectivity, where a participant may still work on the markups without being connected to the network. Under such a circumstance, the modifications made while offline may be uploaded once the network connectivity is restored. Various embodiments of the present disclosure contemplate features that enable such synchronous/asynchronous markup modification sessions.

For example, in a synchronous markup modification session, when a markup 70A is modified by a user of the thin client application 370A, the markup modification may be propagated to the thin client application 370B in real-time and the modified markup is displayed as the markup 70B within the thin client application 370B. Conversely, when the markup 70B is modified by the user of the thin client application 370B, the markup modification may be propagated to the thin client application 370A in real-time and the modified markup is displayed as the markup 70A within the thin client application 370A. Notably, attributes of the markup 70A (e.g., location, size, color, rotation, markup type, text, etc.) may be identical to those of the markup 70B. The modification may include, but might not be limited to, addition, deletion, movement, replacement (with a different markup), resizing, change of orientation/rotation, text addition/modification, color modification, or any other modification that may be represented at least in part by the cross-compatible markup object.

Various functions performed by the components depicted in FIG. 2 will now be described. It should be appreciated that the described methods are merely exemplary. In some embodiments, the methods may include a number of additional or alternative steps, and in some embodiments, one or more of the described steps may be omitted. Any described step may be omitted or modified, or other steps added, as long as the intended functionality of the document markup synchronization system remains substantially unaltered. Further, although a certain order is described or implied in the described methods, in general, the steps of the described methods need not be performed in the illustrated and described order. Further, the described methods may be incorporated into a more comprehensive procedure or process having additional functionality not described herein.

Figure 4:
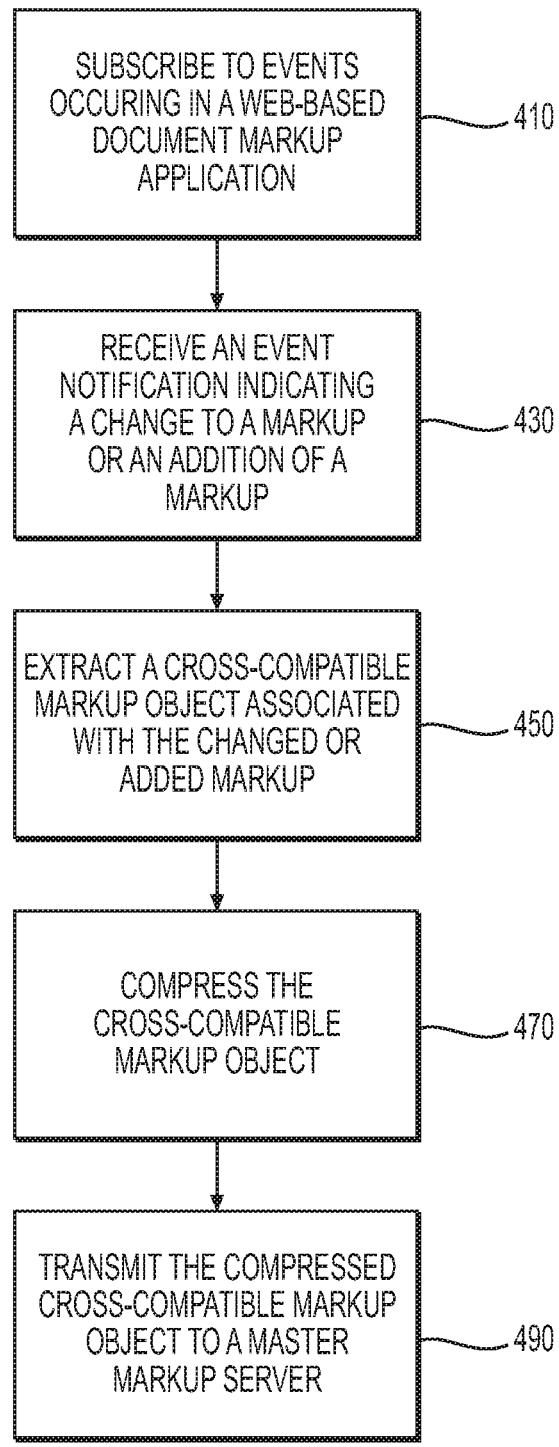
FIG. 4 is a flowchart illustrating an exemplary method of extracting and transmitting a cross-compatible markup object by a thin client application, according to one aspect of the present disclosure.

FIG. 4 is a flowchart illustrating an exemplary method of extracting and transmitting a cross-compatible markup object, according to one aspect of the present disclosure. In one embodiment, method 405 may be performed by a thin observer agent 374A at a thin client 300 (i.e., thin client application 370A thereof). First, at step 410, the thin observer agent 374A may subscribe to events occurring in the web-based document markup application 372A. The events may comprise markup modification events. At step 430, in response to an event occurring in the web-based document markup application 372A, the thin observer agent 374A may receive an event notification indicating a change to a markup or an addition of a markup (i.e., indicating a markup modification). At step 450, in response to receiving the notification, the thin observer agent 374A may extract a markup object associated with the changed or added markup. In some embodiments, the thin observer agent 374A may have access to in-memory markup representation (e.g., in-memory JavaScript Object Notation (JSON) representation). In response to being notified of the markup modification event, the thin observer agent 374A may access the in-memory markup representation, and extract the cross-compatible markup object associated with the modified markup. In one embodiment, the cross-compatible markup may be a JSON object representing the modified markup. At step 470, the thin observer agent 374A may compress the cross-compatible markup object, and at step 490, may transmit the compressed cross-compatible markup object to a master markup server 230. In some embodiments, the thin observer agent 374A may transmit the cross-compatible markup object directly to another thin client 300, e.g., thin client application 370B. In some embodiments, the cross-compatible markup object may not be compressed prior to being transmitted. In some embodiments, data transmission between the thin observer agent 374A and the master markup server 230 may take place over the network 100. However, in other embodiments, as discussed above in reference to FIG. 2, data transmission between the thin observer agent 374A and the master markup server 230 may be between components of a single computing device. Further, in some embodiments, the master markup server 230 and the markup translation server 250 may also be implemented in a single computing device (i.e., a single server). Therefore, any subsequent transmission of the cross-compatible markup object between the master markup server 230 and the markup translation server 250 may actually be a transmission between components of a single computing device.

Figure 5:
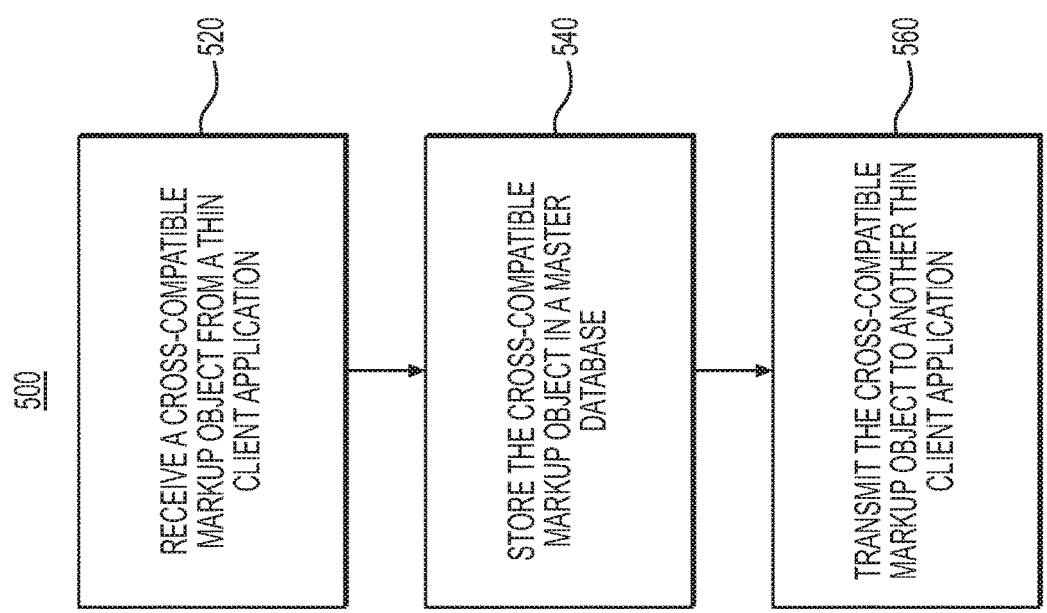
FIG. 5 is a flowchart illustrating an exemplary method of receiving and transmitting a cross-compatible markup object by a master markup server, according to one aspect of the present disclosure.

FIG. 5 is a flowchart illustrating an exemplary method of transmitting a cross-compatible object from a master markup server 230 to a thin client 300 (e.g., thin client application 370B). In one embodiment, method 500 may be performed by master markup server 230. At step 520, the master markup server 230 may receive a cross-compatible object from a thin client 300 such as, for example, a thin observer agent 374A. In the event that the markup object has been compressed by the sending component (i.e., thin client application 370A), the received cross-compatible markup object may be decompressed by the master markup server 230. At step 540, the master markup server 230 may store the cross-compatible object in a master database. At step 560, the master markup server 230 may then transmit the cross-compatible object to another thin client 300 such as, for example, a thin observer agent 374B.

The master markup server 230 may perform other functions in relation to cross-compatible markup objects. As alluded to above, the user of the thin client application 370A may initiate a markup collaboration session, invite one or more other users who may also be on thin client devices running respective thin client applications (e.g., thin client application 370B). The user of the thin client application 370A may also set permissions for each invited user. For example, the user of the thin client application 370B may have limited or full access/privileges to document markups and/or modifications thereof. For example, the permissions may specify whether the invited user is authorized to view, add, modify, delete, upload, and/or download certain markups. Further, the user of the thin client application 370A may be able to specify permissions for the invited users with respect to each other. For the purposes of illustration only, it will be assumed there are three users in a collaboration session: user A who started the collaboration session, and user B and user C who are invitees. In addition to setting the overall permissions for user B and user C, such as whether they are authorized to view, add, modify, delete, upload, and/or download certain markups, user A may also specify what user B can see or do with respect to any markup modification performed by user C, and vice versa. For example, user A may specify whether user B is permitted to view markup modification performed by user C, and whether user C is permitted to view markup modification performed by user B during the collaboration session. Further, user A may be able to specify, if user B is permitted to view markup modification performed by user C, whether user B can also add, modify, or delete markups being manipulated by user C. Therefore, the initiator of the collaboration session may be able to set general permissions for the invited users (i.e., permissions with respect to all markups involved during collaboration session), and/or may also be able to set more fine-grained permissions for each invited user with respect to one or more other invited users (i.e., permissions with respect to markups created/manipulated by other invited user(s) during collaboration session). In one embodiment, permission configuration may be role-based and/or group-based. Additionally or alternatively, permission levels may be assigned to each individual independently (i.e., user-based). To facilitate the permissioning mechanism, the master markup server 230 may receive such permission settings from a thin client application (e.g., thin client application 370A) and apply them to thin client applications of the invited users (e.g., thin client application 370B), so that the invited users may be allowed a level of access that was predefined by the user who started the collaboration session.

Figure 6:
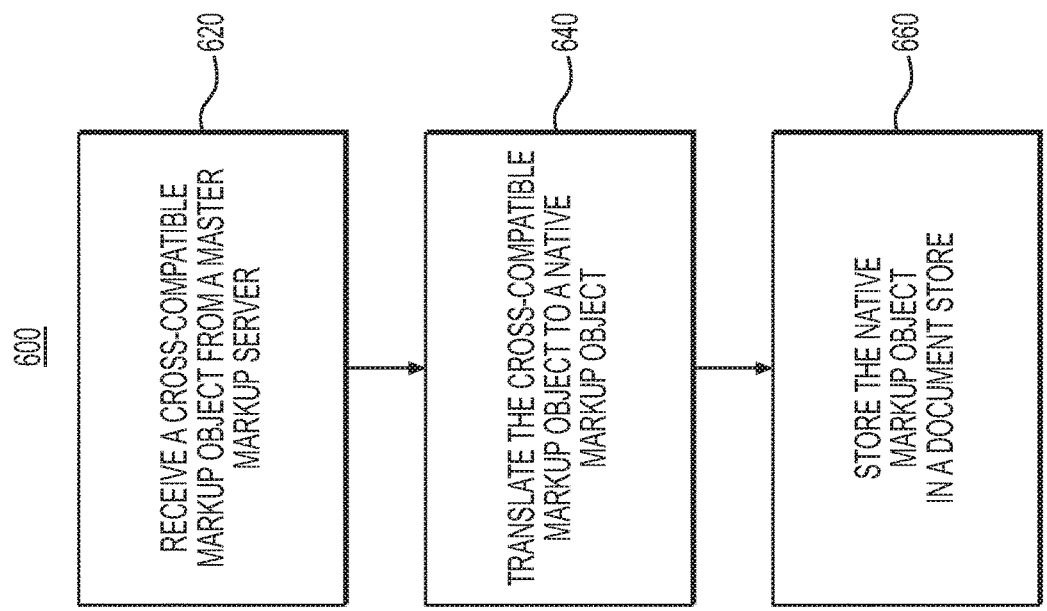
FIG. 6 is a flowchart illustrating an exemplary method of translating a cross-compatible markup object to a native markup object by a markup translation server, according to one aspect of the present disclosure.

FIG. 6 is a flowchart illustrating an exemplary method of translating a cross-compatible object to a native markup object. Notably, method 600 may be performed by markup translation server 250. At step 620, the markup translation server 250 may receive a cross-compatible markup object from master markup server 230. In some embodiments, the markup translation server 250 may receive the cross-compatible markup object directly from the thin client application 370A, bypassing the master markup server 230. In the event that the markup object has been compressed by the sending component (i.e., master markup server 230 or thin client application 370A), the received cross-compatible markup object may be decompressed by the markup translation server 250. At step 640, the markup translation server 250 may translate the cross-compatible markup object to a native markup object. FIG. 7 illustrates an exemplary cross-compatible markup object 70A and a corresponding exemplary native markup object 10A. In one embodiment, a cross-compatible markup object may be a JSON object describing the markup modified by the user of the web-based document markup application 372A and a native markup object may be a PDF dictionary object corresponding to the cross-compatible markup object describing the modified markup (i.e., a PDF dictionary object translated from the JSON object). The format associated with the cross-compatible markup object may be more browser/web-compatible (i.e., substantially less processing intensive in a browser/web environment) than the PDF dictionary markup object. In FIG. 7, the exemplary cross-compatible markup object 70A (i.e., JSON object representing a "circle" markup applied to a PDF) and the corresponding native markup object 10A (i.e., a PDF dictionary object converted from the JSON object) are shown side-by-side.

Referring back to FIG. 6, at step 660, the markup translation server 250 may store the native markup object in a document store. The document store may be a storage resident in the markup translation server 250, or a storage remotely located from the markup translation server 250. As alluded to above, thick client application 410 may retrieve the native markup object to render the modified markup within the document markup application 412, as needed. In some embodiments, native markup objects may be transmitted to the thick client application 410 as they become available at the markup translation server 250, or if the markups represented by the native markup objects have not been committed yet in the thick client application 410.

Figure 8:
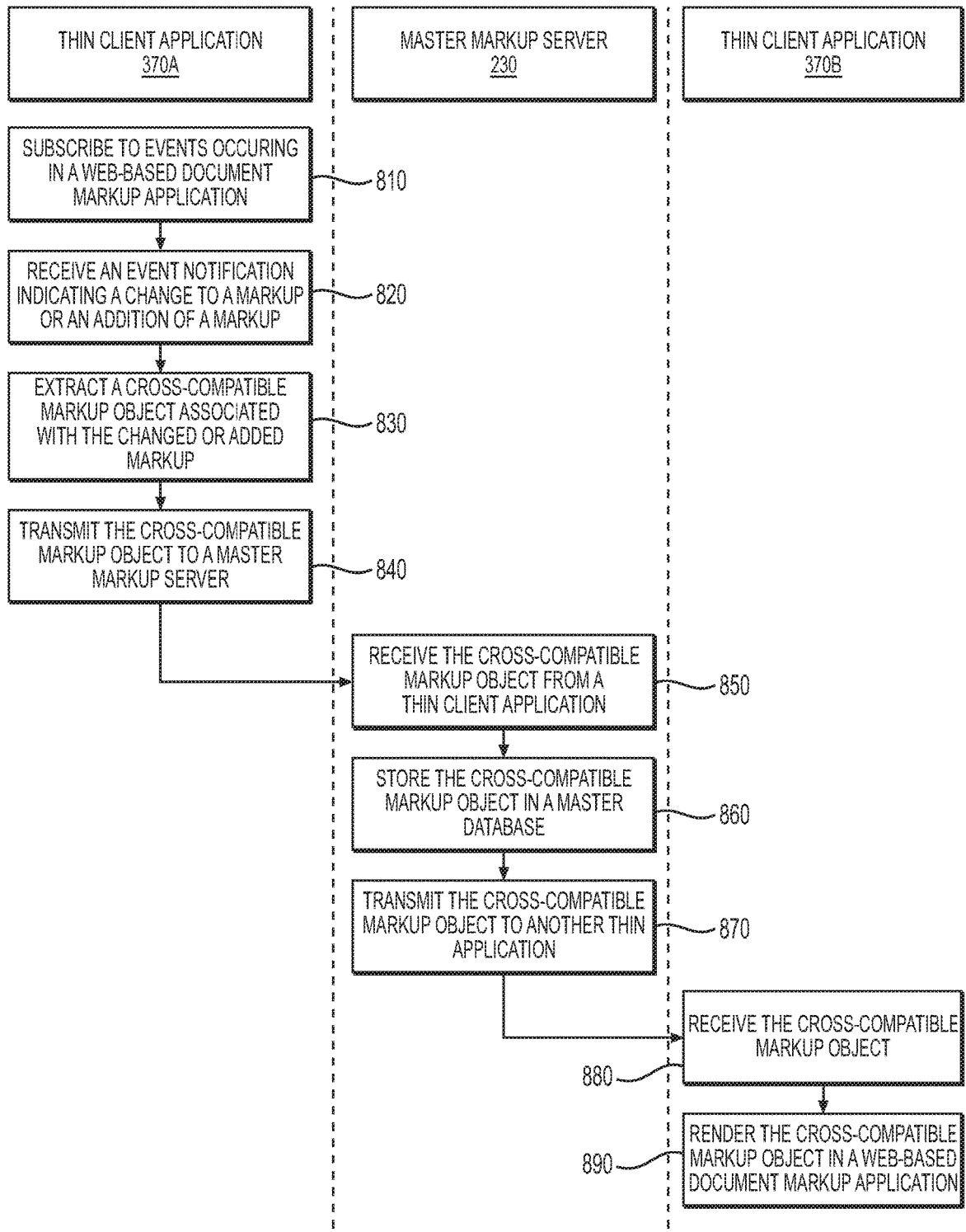
FIG. 8 depicts a system flowchart illustrating an exemplary method of synchronizing a document markup modification across a plurality of thin client devices, according to one aspect of the present disclosure.

FIG. 8 is a system flowchart illustrating an exemplary method of synchronizing a document markup modification across a plurality of thin client devices. In particular, FIG. 8 illustrates a method of propagating a document markup modification made using a thin client application 370A (or the web-based document markup application 372A thereof) to a thin client application 370B (or the web-based document markup application 372B thereof).

At step 810, thin observer agent 374A may subscribe to events occurring in the web-based document markup application 372A. The events may comprise markup modification events. At step 820, in response to an event occurring in the web-based document markup application 372A, the thin observer agent 374A may receive an event notification indicating a change to a markup or an addition of a markup (i.e., indicating a markup modification). At step 830, in response to receiving the notification, the thin observer agent 374A may extract a cross-compatible markup object associated with the changed or added markup. Then, at step 840, the thin observer agent 374A may transmit the cross-compatible markup object to a master markup server 230. The cross-compatible markup object may be compressed prior to transmission.

With continuing reference to FIG. 8, at step 850, the master markup server 230 may receive the cross-compatible markup object from the thin client application 370A. As alluded to above, the master markup server 230 may also receive user permission settings from the thin client application 370A. The received cross-compatible markup object may be decompressed, if it was compressed prior to transmission. At step 860, the master markup server 230 may store the cross-compatible markup object in a master database. Additionally, the master markup server 230 may also store the user permission settings in the master database. At step 870, the master markup server 230 may transmit the cross-compatible markup object to a thin client application 370B (or the web-based document markup application 372B thereof) in a compressed, or non-compressed format. Additionally, the master markup server 230 may transmit the cross-compatible markup object to a markup translation server 250 for translation to a native markup object. Further, in some embodiments, the master markup server 230 may transmit the user permission settings to the thin client application 370B.

At step 880, the thin client application 370B may receive the cross-compatible markup object from the master markup server 230, along with any other data such as the user permission settings. The cross-compatible markup object may be decompressed, if it was compressed prior to transmission. At step 890, the thin client application 370B may render the cross-compatible markup object in the web-based document markup application 372B. In some embodiments, the cross-compatible markup object may be rendered within the web-based document markup application 372B in accordance with the user permission settings received from the master markup server 230.

Embodiments of the present disclosure concerning synchronizing a document markup modification across a plurality of thin client devices addresses the drawbacks of the prior approaches, using some of the techniques discussed above. In general, the embodiments of the present disclosure have at least the following distinguishable features that lead to significant technical improvements:
1) Renders markup objects across various types of thin client devices without duplicating markup interpretation/translation logic on each of those devices, by using bindings stored in a markup library.
2) Open format markups suitable for consumption by a variety of computing platforms (e.g., thick/thin clients, third party applications, etc.).
3) Enables markups to flow throughout the document markup modification ecosystem, regardless of the clients or services producing or consuming the markup information.

Unless specifically stated otherwise, as apparent from the following discussions, it is appreciated that throughout the specification discussions utilizing terms such as "processing," "computing," "calculating," "determining", "analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer," a "computing machine," a "computing platform," a "computing device," or a "server" may include one or more processors.

FIG. 9 illustrates an implementation of a computer system designated 900. The computer system 900 can include a set of instructions that can be executed to cause the computer system 900 to perform any one or more of the methods or computer based functions disclosed herein. The computer system 900 may operate as a standalone device or may be connected, e.g., using a network, to other computer systems or peripheral devices.

In a networked deployment, the computer system 900 may operate in the capacity of a server or as a client user computer in a server-client user network environment, or as a peer computer system in a peer-to-peer (or distributed) network environment. The computer system 900 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 900 can be implemented using electronic devices that provide voice, video, or data communication. Further, while a single computer system 900 is illustrated, the term "system" shall also be taken to include any collection of systems or sub-systems that individually or jointly execute a set, or multiple sets, of instructions to perform one or more computer functions.

As illustrated in FIG. 9, the computer system 900 may include a processor 902, e.g., a central processing unit (CPU), a graphics processing unit (GPU), or both. The processor 902 may be a component in a variety of systems. For example, the processor 902 may be part of a standard personal computer or a workstation. The processor 902 may be one or more general processors, digital signal processors, application specific integrated circuits, field programmable gate arrays, servers, networks, digital circuits, analog circuits, combinations thereof, or other now known or later developed devices for analyzing and processing data. The processor 902 may implement a software program, such as code generated manually (i.e., programmed).

The computer system 900 may include a memory 904 that can communicate via a bus 908. The memory 904 may be a main memory, a static memory, or a dynamic memory. The memory 904 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 904 includes a cache or random-access memory for the processor 902. In alternative implementations, the memory 904 is separate from the processor 902, such as a cache memory of a processor, the system memory, or other memory. The memory 904 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 904 is operable to store instructions executable by the processor 902. The functions, acts or tasks illustrated in the figures or described herein may be performed by the programmed processor 902 executing the instructions stored in the memory 904. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 900 may further include a display 910, such as a liquid crystal display (LCD), an organic light emitting diode (OLED), a flat panel display, a solid-state display, a cathode ray tube (CRT), a projector, a printer or other now known or later developed display device for outputting determined information. The display 910 may act as an interface for the user to see the functioning of the processor 902, or specifically as an interface with the software stored in the memory 904 or in the drive unit 906.

Additionally or alternatively, the computer system 900 may include an input device 912 configured to allow a user to interact with any of the components of system 900. The input device 912 may be a number pad, a keyboard, or a cursor control device, such as a mouse, or a joystick, touch screen display, remote control, or any other device operative to interact with the computer system 900.

The computer system 900 may also or alternatively include a disk or optical drive unit 906. The disk drive unit 906 may include a computer-readable medium 922 in which one or more sets of instructions 924, e.g. software, can be embedded. Further, the instructions 924 may embody one or more of the methods or logic as described herein. The instructions 924 may reside completely or partially within the memory 904 and/or within the processor 902 during execution by the computer system 900. The memory 904 and the processor 902 also may include computer-readable media as discussed above.

In some systems, a computer-readable medium 922 includes instructions 924 or receives and executes instructions 924 responsive to a propagated signal so that a device connected to a network 100 can communicate voice, video, audio, images, or any other data over the network 100. Further, the instructions 924 may be transmitted or received over the network 100 via a communication port or interface 920, and/or using a bus 908. The communication port or interface 920 may be a part of the processor 902 or may be a separate component. The communication port 920 may be created in software or may be a physical connection in hardware. The communication port 920 may be configured to connect with a network 100, external media, the display 910, or any other components in computer system 900, or combinations thereof. The connection with the network 100 may be a physical connection, such as a wired Ethernet connection or may be established wirelessly as discussed below. Likewise, the additional connections with other components of the computer system 900 may be physical connections or may be established wirelessly. The network 100 may alternatively be directly connected to the bus 808.

While the computer-readable medium 922 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 922 may be non-transitory, and may be tangible.

The computer-readable medium 922 can include a solid-state memory such as a memory card or other package that houses one or more non-volatile read-only memories. The computer-readable medium 922 can be a random-access memory or other volatile re-writable memory. Additionally or alternatively, the computer-readable medium 922 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 900 may be connected to one or more networks 100. The network 100 may define one or more networks including wired or wireless networks. The wireless network may be a cellular telephone network, an 802.11, 802.16, 802.20, or WiMax network. Further, such networks may include a public network, such as the Internet, a private network, such as an intranet, or combinations thereof, and may utilize a variety of networking protocols now available or later developed including, but not limited to TCP/IP based networking protocols. The network 100 may include wide area networks (WAN), such as the Internet, local area networks (LAN), campus area networks, metropolitan area networks, a direct connection such as through a Universal Serial Bus (USB) port, or any other networks that may allow for data communication. The network 100 may be configured to couple one computing device to another computing device to enable communication of data between the devices. The network 100 may generally be enabled to employ any form of machine-readable media for communicating information from one device to another. The network 100 may include communication methods by which information may travel between computing devices. The network 100 may be divided into sub-networks. The sub-networks may allow access to all of the other components connected thereto or the sub-networks may restrict access between the components. The network 100 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A method of synchronizing a document markup modification across a plurality of devices, comprising:

subscribing to one or more events occurring in a first thin client document markup application installed in a first device;

receiving a notification indicating a modification to a document markup in the first thin client document markup application;

generating a JavaScript Object Notation (JSON) object representative of the modified document markup;

receiving permission settings defined by the first device representative of access limitations to the modified document markup based on a group of a device receiving the modified document markup;

transmitting, the JSON object and the permission settings to a second thin client document markup application installed in a second device, such that the JSON object is accessible at the second device in accordance with the permission settings; and transmitting, the JSON object and the permission settings to a markup translation server, wherein the markup translation server translates the JSON object to a portable document format (PDF) dictionary object and transmits the PDF dictionary object and the permission settings to a thick client document markup application installed in a third device, such that the PDF dictionary object is accessible at the third device in accordance with the permission settings;

wherein the group of the second device is different from the group of the third device such that access to the JSON object at the second device varies from access of the PDF dictionary object at the third device based on the second device and the third device being of different groups.

2. The method of claim 1, wherein each of the first and second thin client document markup applications is a web-based document markup application.

3. The method of claim 1, wherein the JSON object is transmitted to the second thin client document markup application installed in a second device and the markup translation server via a master markup server.

4. The method of claim 3, wherein the master markup server is configured to determine whether a recipient application is a thin client document markup application or a thick client document markup application.

5. The method of claim 1, wherein each of the first thin client document markup application and the second thin client document markup application is coupled to a markup library, the markup library comprising computer readable codes to render the JSON object in a thin client document markup application.

6. The method of claim 5, wherein the computer readable codes comprise bindings for multiple types of thin client document markup applications including the first thin client document markup application and the second thin client document markup application.

7. The method of claim 1, wherein transmitting the JSON object to the second thin client document markup application comprises:
transmitting the JSON object to a master markup server, wherein the master markup server is configured to transmit the JSON object to the second thin client document markup application.

8. The method of claim 1, wherein the JSON object is transmitted to the markup translation server via a master markup server, the master markup server being configured to route the JSON object to the markup translation server upon determining a recipient application is a thick client document markup application.

9. The method of claim 1, wherein the second thin client document markup application renders the document markup on a display of the second device based on the JSON object.

10. The method of claim 1, wherein the JSON object is transmitted to the markup translation server via a master markup server, the master markup server being configured to store the JSON object in a database.

11. The method of claim 10, wherein the master markup server is further configured to store the PDF dictionary object in the database.

12. A system for synchronizing a document markup modification across a plurality of devices, comprising:
one or more processors; and
at least one non-transitory computer readable medium storing instructions which, when executed by the one or more processors, cause the one or more processors to perform a method comprising:
subscribing to one or more events occurring in a first thin client document markup application installed in a first device;
receiving a notification indicating a modification to a document markup in the first thin client document markup application;
generating a JavaScript Object Notation (JSON) object representative of the modified document markup;
receiving permission settings defined by the first device representative of access limitations to the modified document markup based on a group of a device receiving the modified document markup;
transmitting, the JSON object and the permission settings to a second thin client document markup application installed in a second device, such that the JSON object is accessible at the second device in accordance with the permission settings; and
transmitting, the JSON object and the permission settings to a markup translation server, wherein the markup translation server translates the JSON object to a portable document format (PDF) dictionary object and transmits the PDF dictionary object and the permission settings to a thick client document markup application installed in a third device, such that the PDF dictionary object is accessible at the third device in accordance with the permission settings;
wherein the group of the second device is different from the group of the third device such that access to the JSON object at the second device varies from access of the PDF dictionary object at the third device based on the second device and the third device being of different groups.

13. The system of claim 12, wherein each of the first and second thin client document markup applications is a web-based document markup application.

14. The system of claim 12, wherein the JSON object is transmitted to the second thin client document markup application installed in a second device and the markup translation server via a master markup server.

15. The system of claim 12, wherein the second thin client document markup application renders the document markup on a display of the second device based on the JSON object.

16. A non-transitory computer readable medium storing instructions that, when executed by one or more processors, cause the one or more processors to perform a method of synchronizing a document markup modification across a plurality of devices, the method comprising:
subscribing to one or more events occurring in a first thin client document markup application installed in a first device;
receiving a notification indicating a modification to a document markup in the first thin client document markup application;
generating a JavaScript Object Notation (JSON) object representative of the modified document markup;
receiving permission settings defined by the first device representative of access limitations to the modified document markup based on a group of a device receiving the modified document markup;
transmitting, the JSON object and the permission settings to a second thin client document markup application installed in a second device, such that the JSON object is accessible at the second device in accordance with the permission settings; and
transmitting, the JSON object and the permission settings to a markup translation server, wherein the markup translation server translates the JSON object to a portable document format (PDF) dictionary object and transmits the PDF dictionary object and the permission settings to a thick client document markup application installed in a third device, such that the PDF dictionary object is accessible at the third device in accordance with the permission settings;

wherein the group of the second device is different from the group of the third device such that access to the JSON object at the second device varies from access of the PDF dictionary object at the third device based on the second device and the third device being of different groups.

17. The non-transitory computer readable medium of claim 16, wherein the JSON object is transmitted to the markup translation server via a master markup server, the master markup server being configured to route the JSON object to the markup translation server upon determining a recipient application is a thick client document markup application.

18. The non-transitory computer readable medium of claim 16, wherein the second thin client document markup application renders the document markup on a display of the second device based on the JSON object.

19. The non-transitory computer readable medium of claim 16, wherein the JSON object is transmitted to the markup translation server via a master markup server, the master markup server being configured to store the JSON object in a database.

* * * * *